Jan. 15, 1935.  C. SPAETH  1,988,181
STORAGE TANK GAUGE
Filed April 5, 1933
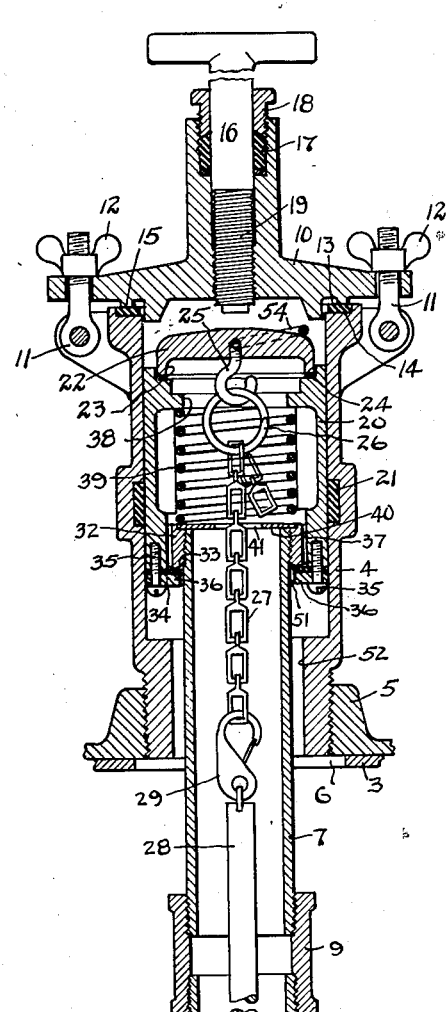
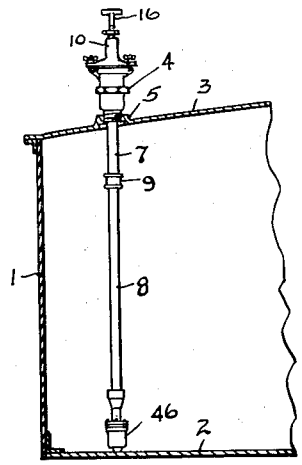
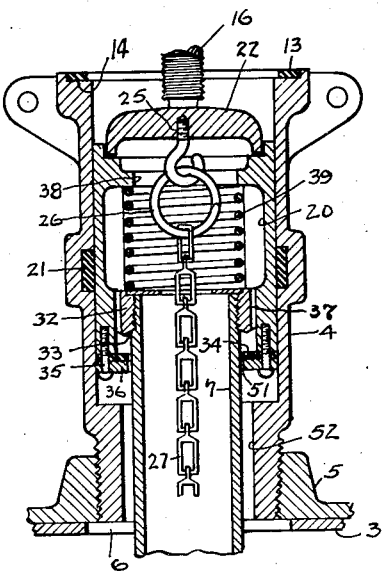
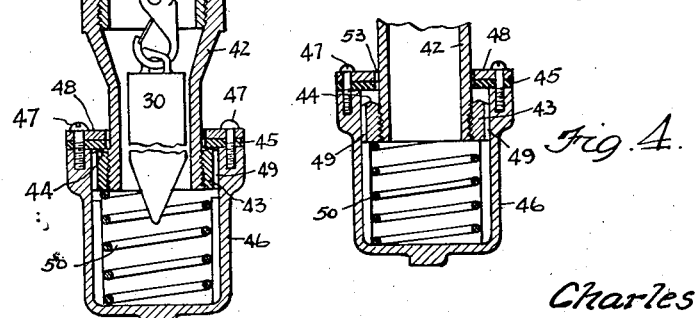
INVENTOR.
Charles Spaeth
BY
Fay, Oberlin & Fay
ATTORNEYS.

Patented Jan. 15, 1935

1,988,181

UNITED STATES PATENT OFFICE 1,988,181

STORAGE TANK GAUGE

Charles Spaeth, Cleveland, Ohio, assignor, by mesne assignments, to Universal Merit Corporation, Cleveland, Ohio, a corporation of Ohio Application April 5, 1933, Serial No. 664,536

14 Claims. (Cl. 73—120)

The present invention relating as indicated to a storage tank gauge has more particular reference to a gauging device applicable to a storage chamber within which is contained a volatile liquid, such as gasoline or oil. Since such storage chambers are now atmospherically sealed in order to conserve vapor losses, it is the general object of my invention to provide a gauging device which will permit access to the interior of such tank while simultaneously preventing the loss of vapor or vapor pressure therefrom.

It is a further object to provide means for measuring the true liquid level in the storage tank, or in other words, to first, eliminate the error and necessity for correction of such error due to the difference in the vapor pressure in the interior of the tank and the atmospheric pressure which is exerted upon the liquid in the gauging tube or well; and second, to eliminate error due to the variation in depth, or deflection of the bottom walls of storage tanks.

Briefly stated, the gauging device constructed according to the principle of my invention consists of a longitudinally movable casing or well which extends vertically into the interior of the storage tank. This casing encloses a gauge line which may be used for measuring the liquid level within the tank or to which may be attached a thermometer for measuring the interior temperature, or a vessel for extracting samples of the liquid. The upper end of the casing extends beyond the top wall of the tank and is enclosed in a housing. A valve means is provided between the upper end of the casing and the housing whereby such casing end may be alternately placed in communication with the interior of the tank and sealed therefrom.

Another housing member and valve means is associated with the lower end of the casing whereby such end may also be alternately placed in communication with the interior of the tank and sealed therefrom. Furthermore, the casing and lower housing members and valve are so constructed as to contact with the bottom wall of the tank, which, in conjunction with the fact that the casing is longitudinally movable with respect to the tank, makes it possible for the casing to seek its own level at all times, or in other words, to follow the deflection of the bottom of the tank and accordingly to render possible a correct liquid level measurement.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:

Fig. 1 is an elevational view showing the assembly of my gauging device on a gasoline or oil storage tank; Fig. 2 is an enlarged sectional view of the general assembly of the elements of the gauging device; Fig. 3 is a detailed sectional view showing the upper casing valve in open position; Fig. 4 is a detailed sectional view of Fig. 2 showing the lower casing valve in open position.

Heretofore in gauging the interior of gasoline storage tanks which are atmospherically sealed and have consequently built up a vapor pressure ranging from 1 to 40 or 50 ounces per square inch, it has been found necessary to relieve this pressure and liberate the enclosed vapors to the atmosphere whenever a gauge well or cover is opened for the insertion of the gauge line. Such a practice not only has proved uneconomical in that a great deal of vapor has been lost, but seriously hazardous in that the sudden effusion of noxious vapors has frequently asphyxiated the gauge line operator. Considerable time has also been lost in that the operator must wait until the pressure within the tank has been relieved before inserting the gauge line in order that an accurate reading may be obtained. When it is considered, by way of illustration, that in the case of a 25,000 barrel tank half full of gasoline or oil and having a vapor pressure of 1 ounce per square inch, that it would take approximately five minutes for the vapor pressure to relieve itself through the opened gauge hole, and that the volume of vapor lost to the atmosphere is equivalent to about ten gallons of gasoline, it is seen that the elimination of such a disadvantageous practice is of unusual benefit.

It has also been heretofore contemplated to insert a tube or casing, commonly known in the trade as a "gauge well" into the interior of the tank in which the upper end of the well is sealed to the gauge well opening, and the lower end is open at all times to the interior of the tank. This latter type of gauge well has eliminated the disadvantages of vapor loss, but nevertheless, due to the difference in atmospheric pressure exerted upon the liquid within the well and the vapor pressure within the interior of the tank, the gauge reading of the liquid level must be corrected in order to compensate for such pressure variation.

When the liquid content of storage tanks is varied, that is, when liquid is added or subtracted from the tank, the bottom wall of the tank, due to the variation in the weight of the liquid exerted thereon, undergoes a variable deflection. For example, in the case of large tanks, it has been known that the distance from the inside bottom of the tank to the inside top of the tank will vary as much as three-fourths of an inch. In a large capacity tank, such a variation in distance, transmitted as an error to the liquid level reading, might mean a discrepancy of several hundred gallons.

The gauging device constructed according to the principle of my invention simultaneously eliminates all of the foregoing disadvantages.

Now referring more particularly to the drawing, in Fig. 1 I have shown a portion of a storage tank comprising the side wall 1, the bottom 2 and the top or roof plate 3. A housing 4 enclosing the upper portion of my gauging device is preferably threadably secured to the flanged bushing 5 which is in turn bolted or welded to the roof plate 3. The upper housing 4 is placed in alignment with an opening 6 in the roof plate and through which extends the gauge well or casing 7. In the present embodiment, the gauge well 7 consists of a short length of pipe in its upper portion and a relatively long length of pipe 8 which is secured to the short upper length by a suitable coupling or union 9. In this manner, it is possible to accommodate various depths of storage tanks. That is, the pipe length 8 may be made interchangeable so that the remainder of the assembly of the gauging device may be transferred from different sizes of storage tanks and properly fitted thereto merely by removing and installing the proper length of pipe for the section 8.

The housing 4 carries upon its top end a cap 10 which is removably attached thereto by means of the eye bolts 11 and wing nuts 12 positioned around the periphery of the housing and cap. A sealing gasket 13 is seated in an annular groove 14 in the upper end of the housing 4 and is adapted to be contacted by the raised annular rib 15 on the bottom side of the cap 10. In this manner it will be seen that it is possible, by means of tightening down the wing nuts 12, to atmospherically seal the upper end of the housing 4. The cap 10 also has centrally positioned therein a T-bolt 16 which is also sealed by means of the packing 17 and beveled seat bushing 18. The lower portion of the T-bolt 16 is threadably engaged as at 19 to the cap 10 in order that the T-bolt may be lowered and raised in the interior of the housing 4, the function of which will presently be more definitely set forth.

A cylindrical element 20 slidably engages with the interior of the housing, much in the manner of a piston. A packing gasket 21 serves to seal the piston 20 in its slidable engagement with the interior wall of the housing 4. A removable cap 22 has a downwardly turned annular flange 23 which is adapted to seat upon a gasket 24 positioned in the upper end of the piston 20. An eye screw 25 extends downwardly from the center of the under side of the cap 22 and is in turn adapted to engage with the split ring 26. A chain 27 is attached to the split ring 26 and in turn is removably attached to the gauge line 28 by means of the snap hook 29. The gauge line 28 extends down into the interior of the pipe or casing 7 and has a plumb-bob 30 attached on its lower end by means of another snap hook 31.

The upper end of the gauge line casing 7 carries a collar 32 having a lower beveled or conical face 33 which is adapted to seat upon the gasket 34. The gasket 34 is attached to the lower end of the piston 20 by means of fastening screws 35 and the retaining or guide ring 36. It should be further noted that the collar 32 is spaced from the inner wall of the piston 20 in order to form a passage way 37.

An inwardly projecting annular flange 38 on the piston 20 serves as an abutment for the end of the coiled compression spring 39 which also engages with the upper end of the casing 7. The function of the coiled spring 39 is normally to urge the lower conical surface 33 of the collar 32 into engagement with the gasket 34.

A guard plate 40 is positioned between the upper end of the housing 7 and the coil spring 39 and has a central opening 41 therein for centering, guiding and protecting the gauge line 28 when the latter is inserted and removed from the interior of the casing 7.

The lower end of the casing section 8 is threadably engaged by means of an adapter 42. The adapter 42 in turn carries a collar 43, which similarly to the collar 32, has an upper beveled or conical surface 44. The surface 44 of the collar 43 is adapted to engage with a gasket 45 which is in turn secured to the cup-shaped housing 46 by means of the fastening screws 47 and the retaining ring 48. The housing 46 rests upon the bottom wall 2 of the storage tank. The collar 43 is also spaced from the inner wall of the housing 46 in order to form an annular passage 49 therebetween. A coiled compression spring 50 engages with the bottom of the housing 46 and the bottom of the adapter 42 and normally urges the latter in an upward direction in order to seat the surface 44 against the gasket 45.

It should be noted that the collars 32 and 43 positioned upon each end of the gauge line casing in effect provide valves which are adapted to seat upon their respective gaskets or valve seats 33 and 44. It should also be noted that the outer diameter of the casing 7 is spaced from the inner diameter of the gasket 34 and guide ring 36 in order to provide an annular passage 51. A second passage 52 connects the passage 51 to the opening 6 into the interior of the tank. Similarly the adapter 42 has a smaller outer diameter than the inner diameter of the seat gasket 45 and guide ring 48 in order to provide an annular passage 53.

The operation of the above described device is as follows:

In normal position, that is, when the gauging operation is not being conducted, the cap 10 is screwed down and sealed to the top of the housing 4. The cap 22 is also in position upon the upper end of the piston 20. The T-bolt 16 is then screwed down until it contacts with the top of the cap 22 thereby forcing the piston 20, the gauge line casing 7, and the casing section 8 downwardly. This latter movement has the effect, as shown in Fig. 3, of moving the seat away from the lower edge 33 of the collar 32 so that the upper end of the gauge line casing is placed in communication with the interior of the storage tank through the passages 37, 51 and 52 respectively. Simultaneously upon the downward movement of the gauge line casing 7 and casing section 8, the lower end of the assembly or the adapter 42 and collar 43 is moved away from the valve seat 45, thereby placing the lower end of the gauge line casing in communication with the interior of the storage tank through the passages 49 and 53 respectively. It will thus be seen, that in normal inoperative position, that the lower end of the gauge line casing is opened to communication with the bottom or liquid side of the storage chamber; and that the upper end of the gauge line casing is opened to the vapor side or top of the tank, while at the same time, it is sealed to the atmosphere. The respective positions of the device performing the last described function are illustrated in Figs. 3 and 4.

Now when the gauging operation is conducted, the T-bolt 16 is screwed to its upper, non-engaging position as shown in Fig. 2, whereby the coiled spring 39 forces the piston 20 upwardly and closes the upper end of the gauge line casing 7 to the interior of the tank by means of seating the lower edge 33 of the collar 32 upon the valve seat gasket 34. Simultaneously the coil spring 50 forces the entire gauge line casing assembly in an upward direction and closes the lower end thereof to the liquid side or bottom of the storage tank by means of seating the edge 44 of the collar 43 upon its seat gasket 45. Next, the cap 22 is lifted out or removed by its pivoted handle 54 whereby the gauge line 28 may be raised from the interior of the tank and the liquid level mark read therefrom.

It should be noted that in this last described position of operation that the upper end of the gauge line casing is sealed from the interior of the tank as well as the lower end and that access is had from the exterior atmosphere to the interior of the gauge well or gauge line casing. In this manner the equality of liquid levels between the liquid in the interior of the gauge line casing and the liquid in the tank is preserved so that no variation during the gauging operation will occur due to the exertion of interior vapor pressure. Likewise, the upper end of the gauge line casing is sealed to the interior of the tank to prevent the escape of vapors and vapor pressure from the top of the tank.

It should be further noted, that since the bottom of the lower housing 46 is adapted to contact with the bottom wall 2 of the tank, that the casing or well will at all times contact with the tank bottom and correspondingly follow the latter through its variable deflections. This movement, of course, is rendered possible by virtue of the movable piston assembly of the upper end of the casing 7 and its enclosing housing 4. In this manner, a very substantial error due to tank bottom deflection will be eliminated from liquid level measurements.

It should also be obvious to one skilled in the art that my above described device may also be used for the purpose of measuring the temperature of the liquid in the tank by means of attaching a thermometer to the end of the gauge line in place of the plumb-bob 30, or equally well utilized for the purpose of "thieving", i. e., extracting samples from the liquid by means of attaching a small vessel to the end of the gauge line in place of the plumb-bob. Hence, the use of the term "gauge line" in the appended claims is not to be specifically limited to a liquid level measuring means, but is intended to include equivalent measuring devices as noted above.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. Gauging means for a liquid storage chamber comprising the combination of a gauge line, a longitudinally movable casing member surrounding said gauge line, and valve means actuated by movement of said casing member and adapted to normally open the lower end of said casing member to the interior of said storage chamber and to close the lower end of said casing member during gauging operations.

2. Gauging means for a liquid storage chamber comprising the combination of a gauge line, a longitudinally movable casing member surrounding said gauge line, and valve means actuated by movement of said casing member and adapted to normally place the upper end of said casing member in communication with the interior of said chamber and to close the upper end of said casing member from the interior of said chamber during gauging operations.

3. Gauging means for a liquid storage chamber comprising the combination of a gauge line, a longitudinally movable casing member surrounding said gauge line, valve means actuated by movement of said casing member and adapted to normally open the lower end of said casing member to the interior of said storage chamber and to close the lower end of said casing member during gauging operations, and a second valve means also actuated by movement of said casing member adapted to normally place the upper end of said casing member in communication with the interior of said chamber and to close the upper end of said casing member from the interior of said chamber during gauging operations.

4. Gauging means for a liquid storage chamber comprising the combination of a gauge line, a casing surrounding said gauge line and extending into the interior of said chamber, a housing enclosing the upper end of said casing and normally sealing the latter to the atmosphere, a piston resiliently carried upon the upper end of said casing and slidably engaging the interior of said housing, and valve means between the upper end of said casing and said piston adapted to open and close the former to the interior of said chamber.

5. Gauging means for a liquid storage chamber comprising the combination of a gauge line, a casing surrounding said gauge line and extending into the interior of said chamber, a housing enclosing the upper end of said casing and normally sealing the latter to the atmosphere, a piston resiliently carried upon the upper end of said casing and slidably engaging the interior of said housing, valve means between the upper end of said casing and said piston adapted to open and close the former to the interior of said chamber, and exteriorly controlled pressure means for moving said piston, the movement of the latter being adapted to actuate said valve means.

6. Gauging means for a liquid storage chamber comprising the combination of a gauge line, a longitudinally movable casing chamber surrounding said gauge line and horizontally supported by the top wall of said chamber, and spring means urging the lower end of said casing into contact with the bottom of said chamber.

7. Gauging means for a liquid storage chamber comprising the combination of a gauge line, a longitudinally movable casing member surrounding said gauge line, and sealing means actuated by movement of said casing member for closing the ends of the latter to the interior of said chamber on upward movement of said casing member.

8. Gauging means for a liquid storage chamber comprising the combination of a gauge line, a longitudinally movable casing member surrounding said gauge line, sealing means actuated by movement of said casing member for closing the ends of the latter to the interior of said chamber on upward movement of said casing member, and resilient means urging the upward movement of said casing.

9. Gauging means for a liquid storage chamber comprising the combination of a gauge line, a longitudinally movable casing member surrounding said gauge line, the lower end of said casing member resting on the bottom of said chamber, and means on the top wall of said chamber slidably supporting the upper end of said casing member, whereby the latter will contact the bottom of said chamber when the latter varies in height.

10. Gauging means for a liquid storage chamber comprising the combination of a gauge line, a longitudinally movable casing member surrounding said gauge line, the lower end of said casing member resting on the bottom of said chamber, and means slidably supporting the upper end of said casing member, whereby the latter will contact the bottom of said chamber when the latter varies in height, said means being adapted to atmospherically seal the upper end of said casing member.

11. Gauging means for a liquid storage chamber comprising the combination of a gauge line, a longitudinally movable casing member surrounding said gauge line, the lower end of said casing member resting on the bottom of said chamber, supporting means slidably engaging the upper end of said casing member, whereby the latter will contact the bottom of said chamber when the latter varies in height, and resilient means positioned between said supporting means and said casing member adapted to permit variable movement of the latter.

12. Gauging means for a liquid storage chamber, comprising the combination of a gauge line, a longitudinally movable casing enclosing said gauge line, a housing surrounding the upper end of said casing and normally sealing the latter from the atmosphere, a passage in said housing placing the upper end of said casing in communication with the interior of said chamber, and valve means actuated by the movement of said casing and positioned between said passage and the upper end of said casing, said valve means being adapted to normally place the upper end of said casing in communication with the interior of said chamber and to close the upper end of said casing from the interior of said chamber during gauging operations.

13. Gauging means for a liquid storage chamber comprising the combination of a gauge line, a longitudinally movable casing enclosing said gauge line, a housing surrounding the lower end of said casing, a passage between said housing and said casing placing the latter in communication with the interior of said chamber, and valve means actuated by the movement of said casing and positioned between said passage and the lower end of said casing, said valve means being adapted to normally open the lower end of said casing to the interior of said storage chamber and to close the lower end of said casing during gauging operations.

14. Gauging means for a liquid storage chamber comprising the combination of a gauge line, a longitudinally movable casing enclosing said gauge line, a housing surrounding the upper end of said casing and normally sealing the latter from the atmosphere, a passage in said housing placing the upper end of said casing in communication with the interior of said chamber, valve means actuated by the movement of said casing and positioned between said passage and the upper end of said casing, said valve means being adapted to normally place the upper end of said casing in communication with the interior of said chamber and to close the upper end of said casing from the interior of said chamber during gauging operations, a second housing surrounding the lower end of said casing, a passage between said second-named housing and said casing placing the latter in communication with the interior of said chamber, and valve means for opening and closing said last-named passage, said valve means being adapted to normally open the lower end of said casing to the interior of said storage chamber and to close the lower end of said casing during gauging operations.

CHARLES SPAETH.